(12) United States Patent
Szilágyi

(10) Patent No.: US 8,758,533 B2
(45) Date of Patent: Jun. 24, 2014

(54) PROCESS AND APPARATUS TO FOAM A WATER-BASE ADHESIVE

(75) Inventor: Ottó Szilágyi, Szolnok (HU)

(73) Assignee: Henkel AG & Co. KGAA, Duesseldorf (DE)

( * ) Notice: Subject to any disclaimer, the term of this patent is extended or adjusted under 35 U.S.C. 154(b) by 143 days.

(21) Appl. No.: 12/794,824

(22) Filed: Jun. 7, 2010

(65) Prior Publication Data

US 2010/0266834 A1    Oct. 21, 2010

Related U.S. Application Data

(63) Continuation of application No. PCT/EP2008/066798, filed on Dec. 4, 2008.

(30) Foreign Application Priority Data

Dec. 5, 2007    (HU) .................................. 0700784

(51) Int. Cl.
| | |
|---|---|
| *C09J 5/08* | (2006.01) |
| *C09J 5/00* | (2006.01) |
| *C08J 9/08* | (2006.01) |
| *C08J 9/00* | (2006.01) |
| *C08J 9/06* | (2006.01) |

(52) U.S. Cl.
USPC ................. 156/78; 156/497; 521/72; 521/78; 521/97

(58) Field of Classification Search
USPC ......... 428/304.4; 156/78, 497; 521/72, 78, 97
See application file for complete search history.

(56) References Cited

U.S. PATENT DOCUMENTS

| | | | | |
|---|---|---|---|---|
| 4,692,473 | A | * | 9/1987 | Wright et al. .................... 521/72 |
| 6,013,691 | A | | 1/2000 | Braun et al. |
| 6,224,938 | B1 | | 5/2001 | Bamba et al. |
| 6,333,365 | B1 | | 12/2001 | Lucas et al. |
| 6,461,725 | B1 | | 10/2002 | Kanada et al. |
| 6,878,752 | B1 | * | 4/2005 | Aubert ............................ 521/78 |
| 2004/0147625 | A1 | | 7/2004 | Dostal et al. |
| 2004/0250516 | A1 | * | 12/2004 | Maaks et al. .................... 53/473 |
| 2005/0045267 | A1 | | 3/2005 | Muvundamina |

FOREIGN PATENT DOCUMENTS

| | | |
|---|---|---|
| EP | 2008792 A1 | 12/2008 |
| GB | 887078 A | 1/1962 |
| JP | 56116766 A | 9/1981 |
| JP | 5132656 A | 5/1993 |
| WO | 8606328 A1 | 11/1986 |

\* cited by examiner

*Primary Examiner* — Kara Boyle
(74) *Attorney, Agent, or Firm* — Sun Hee Lehmann

(57) ABSTRACT

The invention relates to a process to foam a water-base adhesive wherein a gas is dissolved or generated under pressure in the water phase essentially without the formation of foam. To apply the adhesive in the form of foam, the pressurized adhesive is released through a valve onto a substrate at atmospheric pressure, whereby the dissolved gas separates as gas bubbles. The invention relates further to an apparatus for the implementation of said process comprising a pressure-tight container for the adhesive wherein an overpressure is provided through a first valve, and at the outlet of said container a drain valve is placed. The apparatus further comprises a pressure-tight acid vessel for the acid which is furnished with a second valve at its inlet The outlet of said vessel is connected through a third valve to the container.

12 Claims, No Drawings

PROCESS AND APPARATUS TO FOAM A WATER-BASE ADHESIVE

CROSS-REFERENCE TO RELATED APPLICATIONS

This application is a continuation of International Application No. PCT/EP2008/066798 filed Dec. 4, 2008 which claims priority to Hungarian Patent Application No. P0700784 filed Dec. 5, 2007, the contents of both of which are incorporated herein by reference.

The present invention relates to a process to foam a water-base adhesive. Furthermore it relates to an apparatus for the implementation of said process.

It is known that adhesives should only be applied in a certain thin layer onto the surfaces to be fixed, in order to achieve appropriate adhesion. The use of the adhesives in a least possible quantity is advantageous from all points of view, since the use of less adhesive is more economic, the adhesive dries faster, the weight of the objects stuck together is smaller, as well as it is also advantageous from environmental point of view. However, the machineries used for the this process are not generally able to apply such a thin layer that would be sufficient for an appropriate quality of adhesion in a continuous and reliable manner, which means, more adhesive is used than it would be necessary. For example, at laminating, a thickness of layer of about 30-60 microns would be sufficient, though, the inaccuracy of the machinery is usually higher by one or two orders of magnitude. In order to reduce the quantity of the adhesive used, the machine manufacturers create even more and more precise and, thus, expensive machineries, while producers of adhesives increase the extract content of the adhesives.

The main adhesive users apply a foaming apparatus to solve the problem described, in case of which compressed gas, usually air, is conducted into the adhesive by a special technique. By means of this method the quantity of the effective adhesive can be decreased since a significant proportion of the foamed material applied is gas. One such method is described in the specification of GB 887078 wherein the foaming is achieved in such a manner that the adhesive is vigorously mixed with gas, e.g. nitrogen or air or freon for 10-30 minutes, that is, by means of a "whisking" method, which, on the one hand, necessitates a complicated machinery, and, on the other hand, requires that the conditions of the foaming has to be provided, e.g. by means of adjusting the viscosity, as well as using a foam stabilizing agent, moreover, the apparatus has to be furnished with precise flow control. Since such solutions are complicated and require expensive machinery, they are profitable only in case of using several hundred tons of adhesive per year.

The aim of the invention is to provide a solution for foaming adhesives which can be profitable also in case of using a smaller quantity of adhesive, that is, which does not require any expensive machinery, which can be implemented in a simple way, and at the same time good results can be achieved by it while reducing the necessary amount of adhesive.

WO 86/06328 discloses methods to foam water borne polymer solutions or dispersions. In this process, a salt, preferably a carbonate, is added to the polymer solution or emulsion which generates a gas, especially carbon dioxide, when an acid is added to it. This process leads to an instantaneous foaming as soon as the acid is added to the mixture. Thus, the foaming process cannot be controlled very well.

The present invention is different from this process by first dissolving an added or an in-situ generated gas in the polymer solution or emulsion under pressure, so that no or only limited foaming occurs during this step. Foaming occurs only when the pressure is released in a second step in a controlled manner.

In a general aspect, the process of the present invention can be described as follows:

A process to apply a foamed water-based adhesive which is an aqueous polymer solution or dispersion, wherein
  in a first step (a) a substance which is a gas at 20° C. and a pressure of 101,325 kPa (1 atm) (in the following called "gaseous substance"), the solubility of which in water at 20° C. increases by at least 30%, preferably by at least 50%, more preferably by at least 75%, if the gas pressure is increased from 101,325 kPa (1 atm) to 202,65 kPa (2 atm), is dissolved in the aqueous polymer solution or dispersion contained in a pressure-tight container in an amount that the gas pressure over the aqueous polymer solution or dispersion at 20° C. is at least by 20,265 kPa (0.2 atm), preferably by at least 60 kPa (0.59 atm) higher than the ambient pressure, and that
  in a second step (b) the water-based adhesive which is an aqueous polymer solution or dispersion is released from the pressure-tight container through a valve onto a substrate at ambient pressure, whereby the gaseous substance forms gas bubbles in the aqueous polymer solution or dispersion leaving the valve, thus foaming the aqueous polymer solution or dispersion.

Here, "ambient" pressure" is the atmospheric pressure at the place and at the time where and when the water based adhesive is applied. This pressure varies according to the altitude of the application side, and according to weather conditions.

So, the principle of this invention consists in dissolving a gas in the water-based adhesive under pressure. The pressure is maintained, so that the solution of the gas in the adhesive remains stable, until the adhesive is allowed to leave the pressurized container through a valve. Leaving the valve, the water-based adhesive with the dissolved gas gets under atmospheric pressure. The solution of the gas becomes unstable under the reduced pressure, so that it forms gas bubbles within the water-based adhesive, transforming the water-based adhesive into foam. The degree of foaming is easily controlled by adjusting the pressure difference between the pressure inside the container and atmospheric pressure, and by controlling the size of the aperture of the valve. Thus, the foamed adhesive can be applied onto the substrate in a very controlled fashion, and the need to apply more adhesive than necessary for reasons of safety is considerably reduced.

One way to introduce the gaseous substance into the pressure-tight container holding the water-based adhesive is to connect with this container a pressure cylinder containing the gaseous substance and having a pressure higher than the pressure in the pressure-tight container. Thus, the pressurized gas in the pressure cylinder is transferred partly into the container with the water-based adhesive, increasing the gas-pressure in this container. The enhanced pressure causes the gaseous substance to be partly dissolved in the aqueous phase of the water-based adhesive, until equilibrium conditions are reached. This solution process can be accelerated by agitating the aqueous solution or dispersion, e.g. by stirring. If a suitable valve like a pressure-reduction valve is used to connect the pressure cylinder with the pressure-tight container holding the water-based adhesive, the gas pressure in the pressure-tight container can be easily controlled, thus controlling also the equilibrium amount of gas dissolved in the aqueous phase.

If the gaseous substance can be transformed under atmospheric pressure into a liquid or a solid by cooling it down, it may be introduced into the pressure-tight container holding the water-based adhesive in this form under ambient pressure. If the pressure-tight container is then closed, pressure will build up inside when the liquefied or solidified gaseous substance is warmed up to the prevailing temperature within the pressure-tight container. The gaseous substance within the pressure-tight container dissolves in the aqueous phase until equilibrium conditions are reached. Again, this solution process can be accelerated by agitating the aqueous solution or dispersion, e.g. by stirring. The final pressure and hence the amount of gaseous substance dissolved in the aqueous phase can be controlled by choosing the amount of liquefied or solidified gaseous substance which is introduced into the container. This method works especially well when the gaseous substance can be added as a cold solid, as the transformation from the solid phase to the gas phase needs some time, so that there is time enough to close the pressure-tight container after the addition of the solidified gaseous substance.

It is especially preferred that carbon dioxide is used as the gaseous substance for practising the present invention. It fulfils the solubility criteria of the present invention, and it can easily be generated directly in the aqueous phase of the water-based adhesive as described below, or it can easily be introduced into the pressure-tight container either from a pressurized cylinder or in solid form, known as "dry-ice". Furthermore, it is cheap and non-toxic. Only sufficient ventilation has to be cared for when the foamed adhesive is applied.

Alternatively, the set goal can be achieved according to the present invention in a way that reagents are added into the adhesive, which reagents create a chemical reaction during which gas, preferably carbon dioxide gas, is released within the adhesive in case of decrease of pressure. The homogeneity is ensured by mixing, and, with overpressure of the gas contacting with the adhesive it can be ensured that the foaming will occur only in the event that the adhesive is conducted to a decreased pressure. Thus, the adhesive with foaming capability can be stored in a pressure-tight container, as it is also the case for the embodiments described further above.

In this embodiment, the invention is a process for foaming a water-base adhesive wherein a first reagent(s) is added into the adhesive, where it is dispersed uniformly by mixing, the mixture is pressurized, then, a second reagent(s) is added to the mixture, where it is dispersed uniformly by mixing, and the reagents are selected in a manner that, as a result of their reaction, gas, preferably carbon dioxide gas, is released in the form of bubbles when the pressure is decreased.

In this embodiment, the generation of gas by the chemical reaction between the first and the second reagent corresponds to the first step (a) as described above, the dissolution of the gas in the aqueous phase under pressure. The release of gas in the form of bubbles when the pressure is decreased corresponds to the second step (b) mentioned above, when the water-based adhesive is taken out of the pressure-tight container trough a valve and is applied to a substrate under atmospheric pressure.

The first reagent is preferably a metal carbonate or an ammonium carbonate, or corresponding hydrogen carbonates, or a mixture of different carbonates and/or hydrogen carbonates.

The acid can be any inorganic or organic acid or an acidic salt like, for example, sodium dihydrogen phosphate, as long as the acid or the acidic salt is soluble enough in water to be able to react with the first reagent.

According to a preferred solution a combination of carbonate, advantageously magnesium or calcium carbonate, or a combination of hydrogen carbonate, advantageously sodium hydrogen carbonate is added into the adhesive as a first reagent, preferably in a quantity of 5%-30% in relation to the total weight. Then, an acid, advantageously acetic acid or an inorganic acid, especially phosphoric acid or acidic salts thereof like sodium dihydrogen phosphate, is added to it as a second reagent. Other preferred inorganic acids are sulphuric acid or acidic salts thereof (hydrogen sulphates), or nitric acid. Further preferred organic acids are citric acid, lactic acid or tartaric acid.

It is especially preferred to use such a combination of a first reagent and a second reagent that the salt which is formed from the cation of the first reagent and the anion of the acid has a solubility in water of not more than 1 g/l, preferably of not more than 0.1 g/l, most preferably of not more than 0.01 g/l. This prevents the presence of large quantities of water soluble salts in the final adhesive layer which could weaken the adhesion properties. Instead, the reaction product of the first reagent and the acid is essentially solid and acts as a filler in the adhesive.

The quantity of first reagent may be chosen high enough so that not all of it reacts with the added acid to form a gas, but that part of the first reagent remains as a filler in the adhesive after the reaction with the acid. Alternatively or in addition to this, other fillers which do not react with the added acid can be present in the adhesive.

In order to prevent that gas is released in a considerable quantity before its due time, that is, in order to keep the created gas, especially the carbon dioxide gas, possibly entirely in an absorbed state within the liquid phase, it is preferable to set the (total) pressure of the gas contacting the adhesive mixture at least on an overpressure (=pressure difference to ambient pressure) of 60 kPa (about 0.59 atm), with the presumption of room temperature (20° C.), before adding of the second reagent(s). Then it will be held at this pressure. Thus, the carbon dioxide gas generated as a result of the chemical reaction will be divided entirely between the vapour phase and the liquid phase in a dissolved state essentially or completely without any phase transformation within the liquid, that is, essentially or completely without any formation of bubbles.

The water-based adhesive preferably is a water-base dispersion containing at least one of the following materials: a homo or co-polymer of vinyl acetate, (e.g. polyvinyl acetate homopolymer or softened homopolymer, polyvinyl acetate ethylene copolymer), a polymer or co-polymer of acrylate or acrylic acid or esters thereof, (e.g. acrylate, acrylate copolymer), and/or the adhesive contains an aqueous solution of least one of the following materials: polyvinyl alcohol, starch or dextrin-based natural polymers.

According to another preferred embodiment the adhesive is stored in a (pressure-tight) container, and the acid is stored in an acid vessel. The outlet of the acid vessel is connected through a first valve with the adhesive container. For adding the acid into the adhesive container a pressure is provided at the inlet of the acid vessel through a second valve (e.g. by the action of compressed air or nitrogen, or with the aid of a pump) so that the pressure at the outlet of the acid vessel is higher than the pressure of the part of the adhesive container connected to the acid vessel. This corresponds to the first step (a) as previously described. Then at utilization (i.e. in the course of the second step (b) as previously described), the added adhesive (i.e. the adhesive after the formation of gas by the reaction of the acid with the first reagent), which foams at a decrease of the pressure, is conducted from the container under pressure through a drain valve to the outside, to the surfaces to be fixed by the adhesive and being preferably at atmospheric pressure.

According to a preferred solution the non-volatile content of the adhesive is 5-75% by weight, referred to the total weight of the water-based adhesive. The "non-volatile content" means here the solid remaining after drying the water-based adhesive under ambient pressure at 110° C., until there is no further weight loss on continued drying. Of course, the "volatile" here is mainly water.

The adhesive foamed by the process according to the invention is preferably utilized to fix surfaces (i.e. to bond them together), Preferably, at least one of the surfaces is water-absorbing or at least wettable by water, e.g. for the adhesion of paper to paper, wood to wood, paper to synthetic film, wood to metal, and the like. However, the present invention may also be used to bond hydrophobic surfaces, if the drying conditions for the water-based adhesive are adequately controlled.

The invention further comprises an apparatus for implementation of the process according to one embodiment of the present invention which comprises a pressure-tight container for the adhesive wherein an overpressure is provided through a first valve, and a drain valve is placed at the outlet of the said container. Furthermore, in the said container a mixer driven by a motor is inserted. Furthermore, for the acid it comprises a pressure-tight acid vessel that is furnished with a second valve at its inlet, the outlet of the said vessel is connected through a third valve to the container.

The apparatus comprises the acid vessel preferably in such a manner that the acid vessel is also detachable from the apparatus.

According to the invention, with mixing and adjusting the appropriate pressure, the size of the generated gas bubbles is ideal, the average size is under 200-250 microns, and, according to the invention a saving of adhesive of about 20-40% can be reached.

EXAMPLE

As an example of the process according to the invention the following adhesive mixture composition is the starting point:
polyvinyl acetate ethylene copolymer (Vinavil EVA 202, Vinavil SpA, IT) with an extract content of 55% by weight: 65% by weight;
polyvinyl alcohol (Mowiol 30-92, Kuraray, J P), hydrolized at 88%: 3% by weight;
calcium carbonate in powdered form (Omyacarb, Omya GmbH, AT), with an average grain size of 2 micron: 20% by weight;
water: 12% by weight.

The composition can be produced from the components above in a way that 7 parts of water are mixed with 3 parts of polyvinyl alcohol, and it is boiled up to 96° C. Further 5 parts of water are mixed with 20 parts of calcium carbonate. After this, the three main components are mixed together in an optional order. Then the mixture can be still diluted with water at a degree depending on the viscosity.

In the example, the calcium carbonate is the filler of the adhesive, and at the same time it is also the first reagent which is to be mixed thoroughly with the other components above. After this, the pressure-tight container T1 is filled up with the mixture above, up to a level L1, at the closed positions of a third valve V3 and a drain valve V4. Then, an overpressure of at least 60 kPa is generated in the container T1, over the adhesive mixture, and a first valve V1 is closed. A mixer K, which is inserted through an airtight seal into the container T1, and which can be rotated by a motor M, starts to rotate. To the well-mixed mixture of adhesive and calcium carbonate, acetic acid from a vessel T2, which is filled up to a level L2 with the second reagent, i.e. 20% by weight of acetic acid, is added in a quantity of 3.5% by weight, but a quantity of 2.5-4.5% by weight can also be appropriate, in relation to the total weight of the adhesive mixture, by means of a pressure through a second valve V2 which ensures that the pressure at the outlet of the acid vessel T2 is higher than the pressure at the part of the adhesive container T1 connecting to the acid vessel T2. Then the third valve V3 is opened, while the mixer K is rotated by the motor with a speed of rotation 1000 r/min (=rotations per minute). However, a good result can be achieved also at a speed of rotation 500-3000 r/min. After having added the necessary acid quantity, the third valve V3 is closed, and after adding, the added adhesive is still mixed for 1-1.5 minutes. Then, next to the third valve V3 the vessel T2 can be detached from the apparatus, if necessary. During the chemical reaction occurred in the container T1, carbon dioxide is generated in the adhesive, and, in case of decrease of pressure, that is, during the adhesion procedure when the adhesive mixture has come to atmospheric pressure through the drain valve V4, the carbon dioxide releases which results in foaming. The average size of the generated gas bubbles is under 200-250 microns, and the degree of foaming, that is, the ratio of the densities after and before the foaming is 0.66.

For instance, the process and apparatus, described above as an example, can be used very well for the adhesion of paper to paper, but also for that of other surfaces where preferably at least one of the surfaces shows water-absorbing feature.

The invention claimed is:

1. A process for foaming a water-based adhesive comprising the steps:
    a. providing a water-based adhesive, wherein the water-based adhesive is an aqueous polymer solution or dispersion held at room temperature and at a pressure 0.59 atm greater than ambient pressure;
    b. adding and mixing 5-30 wt %, based on the total weight of the adhesive, of a first reagent, which is a metal carbonate or an ammonium carbonate, or the corresponding hydrogen carbonates, or a mixture of those carbonates and/or those hydrogen carbonates, into the adhesive;
    c. adding and mixing a second reagent, which is an organic or inorganic acid, or acidic salt, into the adhesive at a pressure higher than steps (a) and (b);
    wherein the reaction from the first reagent and the second regent forms carbon dioxide gas, and the gas is divided between a vapour phase and a liquid phase, and in which the gas remains dissolved without formation of bubbles within the liquid phase; and
    d. releasing the adhesive at an ambient pressure, causing the adhesive to foam.

2. The process of claim 1 further comprising step (e) applying the foamed adhesive onto a substrate.

3. The process of claim 2 wherein the substrate is paper, wood, synthetic film or metal.

4. The process of claim 1 wherein the adhesive comprises a homo or co-polymer of vinyl acetate, a polymer or co-polymer of acrylate or acrylic acid or esters thereof.

5. The process of claim 1 wherein the adhesive comprises polyvinyl alcohol, starch or dextrin-based natural polymers.

6. The process of claim 1 wherein the adhesive contains 5-75 wt %, based on total weight, of non-volatiles.

7. A process for foaming a water-based adhesive comprising the steps:
    a. providing a water-based adhesive, wherein the water-based adhesive is an aqueous polymer solution or dispersion;

b. adding and mixing a metal carbonate into the adhesive and then pressurizing the adhesive;

c. adding and mixing an organic acid into the adhesive at a higher pressure than in step (b);

wherein the reaction from the metal carbonate and the organic acid forms carbon dioxide gas, and the gas is divided between a vapour phase and a liquid phase, and in which the gas remains dissolved without formation of bubbles within the liquid phase; and d. decreasing the pressure to ambient pressure, to foam the adhesive.

8. The process of claim 7 further comprising step (e) applying the foamed adhesive onto a substrate.

9. The process of claim 8 wherein the substrate is paper, wood, synthetic film or metal.

10. The process of claim 7 wherein the adhesive comprises a homo or co-polymer of vinyl acetate, a polymer or co-polymer of acrylate or acrylic acid or esters thereof.

11. The process of claim 7 wherein the adhesive comprises polyvinyl alcohol, starch or dextrin-based natural polymers.

12. The process of claim 7 wherein the adhesive contains 5-75 wt %, based on total weight, of non-volatiles.

\* \* \* \* \*

UNITED STATES PATENT AND TRADEMARK OFFICE
CERTIFICATE OF CORRECTION

PATENT NO. : 8,758,533 B2
APPLICATION NO. : 12/794824
DATED : June 24, 2014
INVENTOR(S) : Otto Szilagyi Page 1 of 1

It is certified that error appears in the above-identified patent and that said Letters Patent is hereby corrected as shown below:

On The Title Page,
Page 1, in [57] Abstract, lines 1 and 2: After "adhesive", insert -- , --.
Page 1, in [57] Abstract, line 9: After "adhesive", insert -- , --.
Page 1, in [57] Abstract, line 13: After "inlet", insert -- . --.
In The Specification,
Column 1, line 22: After "for", delete "the".
Column 1, line 40: After "887078", insert -- , --.
Column 2, line 27: After "ambient", delete """".
Column 2, line 28: Change "water based" to -- water-based --.
Column 3, line 40: After "adhesive", insert -- , --.
Column 3, line 54: Change "trough" to -- through --.
Column 5, line 20: After "adhesive", insert -- , --.
In The Claims,
Column 6, line 41: After "adhesive", insert -- in the container --.
Column 6, line 46: Change "regent" to -- reagent --.
Column 6, line 51: Replace "the adhesive to foam.", with -- the first reagent and the second reagent to react and foam. --.
Column 7, line 2: After "adhesive", insert -- in the container --.
Column 7, line 5: Change "metal carbonate" to -- first reagent --.
Column 7, line 6: Change "organic acid" to -- second reagent --.
Column 7, line 10: After "pressure,", delete "to".
Column 7, line 10: After "pressure,", insert -- whereby the metal carbonate and the organic acid react and --.

Signed and Sealed this
Ninth Day of August, 2016

Michelle K. Lee
*Director of the United States Patent and Trademark Office*